(12) United States Patent
Alvin et al.

(10) Patent No.: US 7,018,446 B2
(45) Date of Patent: Mar. 28, 2006

(54) METAL GAS SEPARATION MEMBRANE

(75) Inventors: Mary Anne Alvin, Pittsburgh, PA (US); Jason Ryan Babcock, Topanga, CA (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 175 days.

(21) Appl. No.: 10/669,845

(22) Filed: Sep. 24, 2003

(65) Prior Publication Data
US 2005/0061145 A1 Mar. 24, 2005

(51) Int. Cl.
*B01D 53/22* (2006.01)
*B01D 71/02* (2006.01)

(52) U.S. Cl. .................. 95/56; 96/10; 96/11; 55/524

(58) Field of Classification Search .............. 95/56, 95/55; 96/4, 8, 10, 11; 55/523, 524, DIG. 5
See application file for complete search history.

(56) References Cited

U.S. PATENT DOCUMENTS

| | | |
|---|---|---|
| 2,824,620 A | 2/1958 | DeRosset |
| 2,848,620 A | 8/1958 | Backus |
| 2,958,391 A | 11/1960 | DeRosset |
| 3,022,187 A * | 2/1962 | Eyraud et al. ............. 428/545 |
| 3,208,198 A | 9/1965 | Rubin |
| 3,241,298 A | 3/1966 | Pierce |
| 3,245,206 A | 4/1966 | Bonnet |
| 3,251,173 A | 5/1966 | Ehlers et al. |
| 3,392,510 A | 7/1968 | Koch, Jr. |
| 3,413,777 A | 12/1968 | Langley et al. |
| 3,477,288 A | 11/1969 | Krcal et al. |
| 3,713,270 A | 1/1973 | Farr et al. |
| 4,039,703 A | 8/1977 | Kamijo et al. |
| 4,132,668 A | 1/1979 | Gryaznov et al. |
| 4,472,175 A | 9/1984 | Malon et al. |
| 4,496,373 A | 1/1985 | Behr et al. |
| 4,589,891 A | 5/1986 | Iniotakis et al. |
| 4,689,150 A | 8/1987 | Abe et al. |
| 4,699,637 A | 10/1987 | Iniotakis et al. |
| 4,711,719 A | 12/1987 | Leenaars et al. |
| 4,857,080 A | 8/1989 | Baker et al. |
| 4,865,630 A * | 9/1989 | Abe .............................. 96/11 |
| 4,880,441 A | 11/1989 | Kesting et al. |
| 4,971,696 A | 11/1990 | Abe et al. |
| 5,015,269 A | 5/1991 | Garrett et al. |
| 5,139,540 A | 8/1992 | Najjar et al. |
| 5,139,541 A | 8/1992 | Edlund |
| 5,205,841 A | 4/1993 | Vaiman |
| 5,217,506 A | 6/1993 | Edlund et al. |
| 5,259,870 A | 11/1993 | Edlund |
| 5,310,414 A | 5/1994 | Najjar et al. |
| 5,342,431 A * | 8/1994 | Anderson et al. ............. 95/45 |
| 5,358,553 A | 10/1994 | Najjar et al. |
| 5,376,167 A | 12/1994 | Broutin et al. |
| 5,384,101 A | 1/1995 | Rockenfeller |
| 5,393,325 A | 2/1995 | Edlund |
| 5,415,891 A | 5/1995 | Liu et al. |
| 5,451,386 A | 9/1995 | Collins et al. |
| 5,456,740 A * | 10/1995 | Snow et al. .................. 96/11 |
| 5,468,283 A | 11/1995 | French et al. |

(Continued)

Primary Examiner—Robert H. Spitzer

(57) ABSTRACT

A high temperature hydrogen gas separation membrane employing a physically interlocking barrier layer to form a spinel or intermetallic architecture bonding the metal barrier layer onto the surface of a fibrous metal medial structural support substrate. A tantalum/niobium interface layer is deposited on the barrier layer. The final layer is a precious metal such as palladium, which is deposited on the tantalum/niobium interface layer.

8 Claims, 2 Drawing Sheets

U.S. PATENT DOCUMENTS

| | | |
|---|---|---|
| 5,487,774 A | 1/1996 | Peterson et al. |
| 5,498,278 A | 3/1996 | Edlund |
| 5,518,530 A | 5/1996 | Sakai et al. |
| 5,599,383 A | 2/1997 | Dyer et al. |
| 5,738,708 A | 4/1998 | Peachey et al. |
| 5,782,959 A | 7/1998 | Yang et al. |
| 5,782,960 A | 7/1998 | Ogawa et al. |
| 5,810,912 A | 9/1998 | Akiyama et al. |
| 5,827,569 A | 10/1998 | Akiyama et al. |
| 5,891,222 A | 4/1999 | Hilgendorff et al. |
| 5,904,754 A | 5/1999 | Juda et al. |
| 5,931,987 A | 8/1999 | Buxbaum |
| 5,938,822 A | 8/1999 | Chen et al. |
| 5,955,044 A | 9/1999 | Lucht et al. |
| 5,980,989 A | 11/1999 | Takahashi et al. |
| 5,989,319 A | 11/1999 | Kawae et al. |
| 6,010,560 A | 1/2000 | Witzko et al. |
| 6,066,592 A | 5/2000 | Kawae et al. |
| 6,083,297 A | 7/2000 | Valus et al. |
| 6,083,390 A | 7/2000 | Hartmann |
| 6,139,810 A | 10/2000 | Gottzmann et al. |
| 6,152,987 A | 11/2000 | Ma et al. |
| 6,171,574 B1 | 1/2001 | Juda et al. |
| 6,171,712 B1 | 1/2001 | Thornton |
| 6,183,542 B1 | 2/2001 | Bossard |
| 6,183,543 B1 | 2/2001 | Buxbuam |
| 6,913,736 B1 * | 7/2005 | Alvin et al. ............... 422/211 |
| 6,916,454 B1 * | 7/2005 | Alvin ............................ 422/211 |
| 2002/0062738 A1 * | 5/2002 | Yoshida et al. ............. 96/11 |
| 2002/0141919 A1 * | 10/2002 | Alvin ............................ 422/211 |
| 2002/0141920 A1 * | 10/2002 | Alvin et al. ............... 422/211 |
| 2003/0061937 A1 * | 4/2003 | Ito et al. ...................... 96/4 |
| 2003/0183080 A1 * | 10/2003 | Mundschau .................. 95/55 |
| 2003/0213365 A1 * | 11/2003 | Jantsch et al. .............. 96/11 |
| 2003/0233940 A1 * | 12/2003 | Takatani et al. .............. 96/4 |
| 2004/0182242 A1 * | 9/2004 | Mitani et al. ................ 96/11 |
| 2004/0237779 A1 * | 12/2004 | Ma et al. ....................... 95/55 |
| 2004/0237780 A1 * | 12/2004 | Ma et al. ....................... 95/55 |
| 2004/0244583 A1 * | 12/2004 | Ma et al. ....................... 95/55 |
| 2004/0244589 A1 * | 12/2004 | Bossard et al. .............. 96/11 |
| 2004/0244590 A1 * | 12/2004 | Ma et al. ....................... 96/11 |
| 2005/0011359 A1 * | 1/2005 | Pan et al. ...................... 96/10 |

* cited by examiner

METAL GAS SEPARATION MEMBRANE

CROSS-REFERENCE TO RELATED APPLICATION

This invention is related to the inventions described in co-pending U.S. patent application Ser. No. 09/822,927, filed Mar. 30, 2001 and Ser. No. 09/952,186, filed Sep. 13, 2001.

BACKGROUND OF THE INVENTION

1. Field of the Invention

The present invention relates generally to gas separation membranes and, more particularly, to a metal membrane for the separation of hydrogen gas from a gas stream.

2. Related Art

Membranes and membrane modules for the separation of hydrogen from other gases are generally known. In particular, useful membranes for hydrogen separation typically can be categorized as being of four general types: (i) polymeric, (ii) porous inorganic, (iii) self-supporting non-porous metal, and (iv) non-porous metal supported on a porous rigid matrix such as metal or ceramic.

Polymeric membranes are commonly used in the form of extended flat sheets of small diameter hollow fibers. Flat sheet polymeric membranes are most often incorporated into spiral-wound modules. Hollow fiber membranes are incorporated into hollow fiber modules, which are very similar in design to shell-and-tube heat exchangers.

Polymeric membranes and membrane modules for hydrogen separation suffer from a lack of high selectivity toward hydrogen over other gases, which results in a relatively impure product gas. Such membranes also suffer from a lack of stability at operating temperatures above 480° F. (250° C.) and chemical incompatibility with many chemicals such as hydrocarbons that are present in an impure hydrogen feed stream.

Porous inorganic-based membranes are typically fabricated from titania, zirconia, alumina, glass, molecular sieving, carbon, silica and or zeolites. All are fabricated with a narrow pore-sized distribution, with the porous inorganic membranes exhibiting high hydrogen permeability, but low selectivity due to relatively large mean pore diameters. Such materials are brittle and thus susceptible to failure due to cracking, and the sealing and fixturing of such porous inorganic-based membranes limit their use to relatively low temperature applications.

Development of supported metal membranes has focused on the utilization of ceramic tubes coated with a thin film of foil of non-porous or dense palladium (Pd) or palladium alloys. The ceramic support tube typically is of a graded porosity from one surface thereof to a second opposite surface. More specifically, the porosity of the ceramic support tube typically is densest at the surface upon which the palladium or palladium alloy is disposed, and the porosity of the tube increases from this surface to a maximum porosity on the surface opposite the layer of palladium. The layer of palladium or palladium alloy is selectively permeable to hydrogen gas and is typically capable of withstanding temperatures of 1500–1600° F. (815–870° C.).

Such ceramic-supported metal membranes are typically housed in shell and tube modules and are fitted with compression gaskets to seal the membrane tube into the module to prevent leakage of the feed gas stream into the permeate gas stream. Potential leak paths between the feed and permeate gas streams can exist due to differences in the coefficients of thermal expansion of the ceramic tube and the metal compression fittings. Additionally, the ceramic support-tubes are inherently brittle and can experience long term thermal fatigue due to repetitive process or system startup and shutdown cycles.

The mechanical adherence of the thin palladium or palladium alloy layer upon the surface of the ceramic support tube requires secure attachment of the film or foil onto the surface of the ceramic, as well as the absence of pinholes or other mechanical rupturing that can occur during manufacture or use of the ceramic tube membrane.

For porous metal membranes such as porous stainless steel and microporous noble metals, Knudsen diffusion or combined Knudsen diffusion-surface diffusion are the primary mechanisms by which gas transport occurs across the membrane. For dense metal membranes such as palladium or palladium alloy foil or film, however, the primary mechanism of gas transport through the metal layer is traditional chemisorption-dissociation-diffusion. Broadly stated, chemisorption-dissociation-diffusion transport involves chemisorption of hydrogen molecules onto the membrane surface, dissociation of hydrogen into atomic hydrogen, transportation of atomic hydrogen through the dense metal, reassociation of atomic hydrogen into hydrogen molecules, and desorption of hydrogen molecules from the media. While Knudsen diffusion typically offers greater flow rates across a membrane than chemisorption-dissociation-diffusion, Knudsen diffusion suffers from reduced hydrogen selectivity as compared with chemisorption-dissociation-diffusion. It is also known that the interaction of a gas stream with catalytic materials can increase the concentration of hydrogen within the reactant or process gas stream. Such catalytic materials enhance the water/gas-shift reaction whereby carbon monoxide is reacted with water to form carbon dioxide and hydrogen gas. Catalytic materials also promote the decomposition of ammonia, which also increases the concentration of hydrogen.

Examples of such catalytic materials include platinum (Pt), palladium (Pd), rhodium (Rh) and the like. While it has been known to apply such catalytic materials to ceramic support substrates to form composite membranes, such composite membranes still suffer from the aforementioned problems associated with the application of palladium and palladium alloy foils and films to ceramic support tubes.

Application Ser. No. 09/822,927, filed Mar. 30, 2001, advances the art in the foregoing respect by providing a porous graded metal substrate on which the palladium or palladium alloy could be mounted either directly or through the interface of a ceramic washcoat. While this teaching significantly advances the art, there is a further need for improving the bond between the substrate and the palladium layer for very high temperature applications such as are found in integrated gasification combined cycle (IGCC), pressurized-fluidized bed combustion (PFBC) or pressurized-circulating fluidized bed combustion (PCFBC) applications. In addition, to promote hydrogen separation, and reduce the cost and use of palladium, the inclusion and application of a mixed metal alloy layer is identified.

SUMMARY OF THE INVENTION

An aspect of the present invention is to provide a gas separation membrane for separating hydrogen from a gas stream that is capable of operating at very high temperatures in an integrated gasification combined cycle or in other pressurized fluidized bed combustion or pressurized circulating fluidized bed combustion applications for extended periods of time. This aspect is achieved by employing a gas separation membrane having a support structure made up of a porous fibrous or particle metal media base layer, preferably followed by a layer or series of metal media layers that contain a higher fiber or particle density than the underlying metal support substrate. A barrier layer composed of metal particles is applied to the surface of the porous metal media substrate. The metal particles in the barrier layer, which include aluminum, are bonded together employing a chemical bond phase. When fired to provide strength, a portion of the aluminum is oxidized, forming alumina which combines with iron or nickel in the substrate metals, establishing an iron aluminide or nickel aluminide spinel within the barrier layer. Physical/mechanical interlocking of the metal/ceramic barrier layer with the underlying fibrous or particle metal support substrate results, providing improved adherence of the coating. The thickness of the barrier layer is less than 100 microns and preferably between 20 and 50 microns in thickness. The barrier layer is followed by a dense palladium chemisorption, dissociation, transport, reassociation layer.

In an alternate preferred embodiment, a tantalum/niobium structural layer is interposed between the palladium layer and the barrier layer, which allows for a reduced thickness of the palladium layer and lower's the cost of the membrane.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Figure 1:
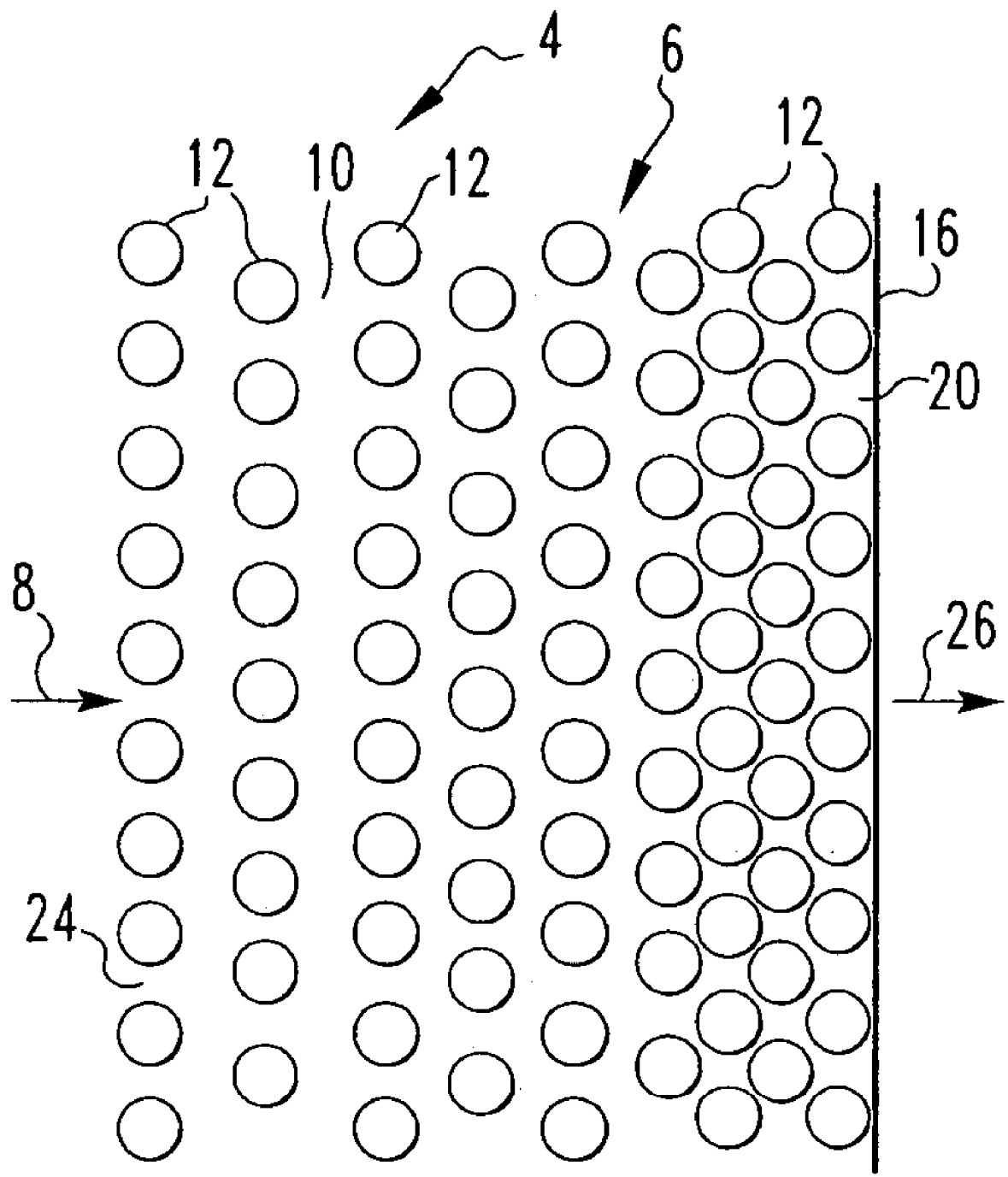
FIG. 1 is a schematic cross-sectional view of a gas separation membrane in accordance with the prior art.

This invention is an improvement to the porous metal membranes described in patent application Ser. No. 09/822,927, filed Mar. 30, 2001, one embodiment of which is illustrated in FIG. 1. The metal gas separation membrane 4 illustrated in FIG. 1 is configured to separate hydrogen gas from a feed gas stream 8. As will be set forth more fully below, the metal gas separation membrane 4 is also configured to be highly selective to hydrogen, meaning that it permits the permeation of hydrogen therethrough and resists the permeation of other gases. The metal gas separation membrane 4 further permits relatively high flow rates of hydrogen therethrough.

The metal gas separation membrane 4 includes a transmission member 6 that can be of numerous shapes, such as plates, tubes, honeycomb configurations and other such shapes. The transmission member 6 is depicted schematically in cross-section in FIG. 1 and includes a porous body 10 made out of the plurality of metal particles or fibers 12 compressed and bonded together and a metal coating of palladium 16 forming a chemisorption, dissociation, transport, reassociation layer on the porous body 10. The porous body 10 includes a first surface 20 and a second surface 24 opposite one another with the metal coating 16 being disposed on the first surface 20.

The metal particles 12 that make up the porous body 10 can be of numerous physical configurations such as metal fibers, metal powder and other shapes, and the porous body 10 can be made up of one type of particle or combinations of these different shaped metal particles 12. The metal particles 12 can be fabricated from known superalloys and/or intermetallic materials to permit the porous body 10 to withstand high temperatures, meaning not only that the material does not melt at the elevated temperatures, but also that the material resists corrosion in the potentially oxidizing or reducing environment in which the membrane 4 is used. It is understood, however, that other materials suited to different applications can be employed to manufacture the metal particles 12 without departing from the concept of the present invention.

The metal particles 12 are compacted and sinter-bonded to form a thin, dense layer of material that makes up the porous body 10. The resultant porous body 10 has a thickness that is generally in the range of approximately 100 microns to 5 mm, although other thicknesses may be appropriate depending upon the specific needs of the particular application. The aforementioned "thickness" thus refers generally to the distance between the first and second surfaces 20 and 24.

As can be seen in FIG. 1, the porosity of the porous body 10 is preferably greater at the second surface 24 than at the first surface 20, meaning that the space between adjacent particles 12 near the second surface 24 is greater than the space between adjacent metal particles 12 near the first surface 20. Alternatively, the porous body 10 can be said to have a density that decreases in a direction from the first surface 20 toward the second surface 24. The porous body 10 depicted in FIG. 1 thus can be said to have a graded porosity or to be asymmetric.

As will be set forth more fully below, the porous body 10 is advantageously configured to provide relatively high hydrogen selectivity at the first surface 20 due to its relatively low porosity. The regions of the porous body extending from the first surface 20 to the second surface 24, being relatively more porous than the first surface 20, have a relatively lower hydrogen selectivity, but correspondingly permit the relatively free flow of gases therethrough. These relatively porous regions of the thicker porous body 10 can thus be said to provide support to the low porosity region of the porous body 10 at the surface 20, which generally is relatively thin and of low strength, without meaningfully impeding the flow of hydrogen therethrough from the second surface 24 to the first surface 20. Preferably, the thicker to thinner regions are continuously graded. It can be seen that the graded porosity feature of the porous body 10 advantageously provides a low porosity region (at the first surface 20) that has high hydrogen selectivity and is relatively thin to promote high hydrogen permeability therethrough, with this low porosity region being supported by a relatively high porosity, thicker region of the porous body 10, which does not impede the flow of hydrogen therethrough. As such, the graded porosity feature of the porous body 10 itself provides both high hydrogen selectivity and high hydrogen flow rates therethrough without the high pressure drop that would be experienced by the hydrogen if the porosity of the porous body 10 was that of the first surface 20 throughout the porous body 10.

As shown in FIG. 1, the metal particles 12 are all of substantially the same size, and the variation in porosity between the first and second surfaces 20 and 24 results from compacting the particles 12 to a greater degree at the first surface 20 than at the second surface 24. In this regard, the porous body 10 can be manufactured out of several layers of metal particles 12, with each layer being compacted to a different degree, or other appropriate methodologies can be employed such as forming each layer out of a slurry of metal particles that are sequentially centrifuged into a cylindrical mandrel, with the layers being centrifuged to different degrees. As described in U.S. patent application Ser. No. 09/822,927, the gradation can also be achieved using layers of different size particles.

The metal coating 16 is a dense layer or foil of precious metals such palladium, palladium alloys, and the like that enhance gas phase chemisorption-diffusion of hydrogen therethrough. As is known in the relative art, the expression gas phase "chemisorption-dissociation-diffusion" of hydrogen refers to molecular chemisorption and dissociation of hydrogen along the high pressure side of the metal coating 16, proton and electron diffusion through the lattice of the metal coating 16, and proton and electron re-association and recombination and desorption of molecular species along the opposite side of the metal coating 16. The metal coating 16 thus can be referred to as a chemisorption-dissociation-diffusion coating. The metal coating 16 can be applied to the porous body 10 in any of a variety of fashions such as via electrolysis plating, electroplating, sputtering, electrodeposition, and the like, or other appropriate method if the coating is non-metallic.

In the embodiment depicted in FIG. 1, the metal gas separation membrane 4 receives the gas separation stream 8 against the second surface 24 and separates hydrogen from the gas stream 8 to form a permeate stream 26 of high purity hydrogen gas that flows out of the side of the metal coating 16 opposite the porous body 10. In this regard, the porous body 10 is configured to permit gases to freely flow through the spaces or pores between the metal particles 12. By way of example, the metal particles 12 may be in the form of fibers selected to be of a size in the range of about from less than 1 to 50 microns in diameter and generally less than 10 mm in length and are compacted to an appropriate degree to permit such flow of gases therethrough. It is understood, however, that particles of different shapes and sizes may be employed without departing from the concept of the present invention.

Hydrogen that passes through porous body 10 and reaches the first surface 20 is then permitted to flow through the metal coating 16 primarily by chemisorption-dissociation-diffusion transport. Hydrogen that has been transported fully through the metal coating 16 forms the permeate stream 26.

As is known in the relevant art, as the thickness of the metal coating 16 increases, the flow rate of hydrogen therethrough by chemisorption-dissociation-diffusion transport decreases. The metal coating 16 is thus preferably configured to be as thin as possible to enhance the flow rate of hydrogen therethrough while maintaining the mechanical integrity of the metal coating 16. The thickness of the metal coating 16 in the prior art applications is thus preferably in approximately the range of 0.1 to 10 microns, although other thicknesses may be appropriate depending upon the specific needs of the particular application.

It can thus be seen that the porous body 10 serves to mechanically support the metal coating 16 thereon. In this regard, it can be seen that the metal particles 12 provide numerous points of contact between the porous body 10 and the metal coating 16, which helps the metal coating 16 to adhere on the porous body 10 during operation of the metal gas separation membrane 4 and during the thermal expansion and contraction of the metal gas separation membrane 4 during startup and shutdown operations. Further, in this regard, the metal particles 12 and metal coating 16 preferably are configured to have compatible coefficients of thermal expansion in order to limit mechanical stresses between the porous body 10 and the metal coating 16, although this is not strictly necessary to achieve the beneficial aspects of the present invention.

As indicated herein before, the metal coating 16 is depicted in FIG. 1 as being disposed on the first surface 20. Alternatively, the metal gas separation membrane 4 can be operated to have gas flow through the transmission member 6 in a direction opposite to that depicted in FIG. 1, meaning that the gas stream 8 could be delivered to the exposed surface of the metal coating 16, and the permeate stream 26 would thus flow out of the second surface 24 of the porous body 10.

From the foregoing, it can be seen that the metal gas separation membrane, in its simplest form, could comprise solely a porous body being manufactured out of metal particles or fibers and having a constant density and porosity throughout, with the porous body serving as the transmission member that separates hydrogen from a gas stream. In addition thereto, the porous body may be of a graded density to reduce the pressure drop across the porous body 10 and/or can additionally include the metal coating 16 to further increase hydrogen selectivity. As such, the configuration of the metal gas separation membrane 4 can be varied to have differing characteristics such as hydrogen selectivity hydrogen flow rate, suitability to high temperatures, and the like, as well as other characteristics, that are suited to the particular environment in which the metal gas separation membrane 4 is used by varying one or more of the physical characteristics of the transmission member 6.

The metal gas separation membrane 4 thus provides a device that can be specifically configured to have desirable characteristics as to hydrogen selectivity, hydrogen flow rate, and suitability for high temperatures, as well as other characteristics. The metal gas separation membrane 4 overcomes many of the problems associated with previous gas separation asymmetric ceramic membranes by providing relatively close correspondence in the coefficients of thermal expansion of the porous body 10 and the metal coating 16, and by promoting the adherence of the metal coating 16 onto the porous body 10. The metal gas separation membrane 4 thus provides increased functionality and versatility.

Figure 2:
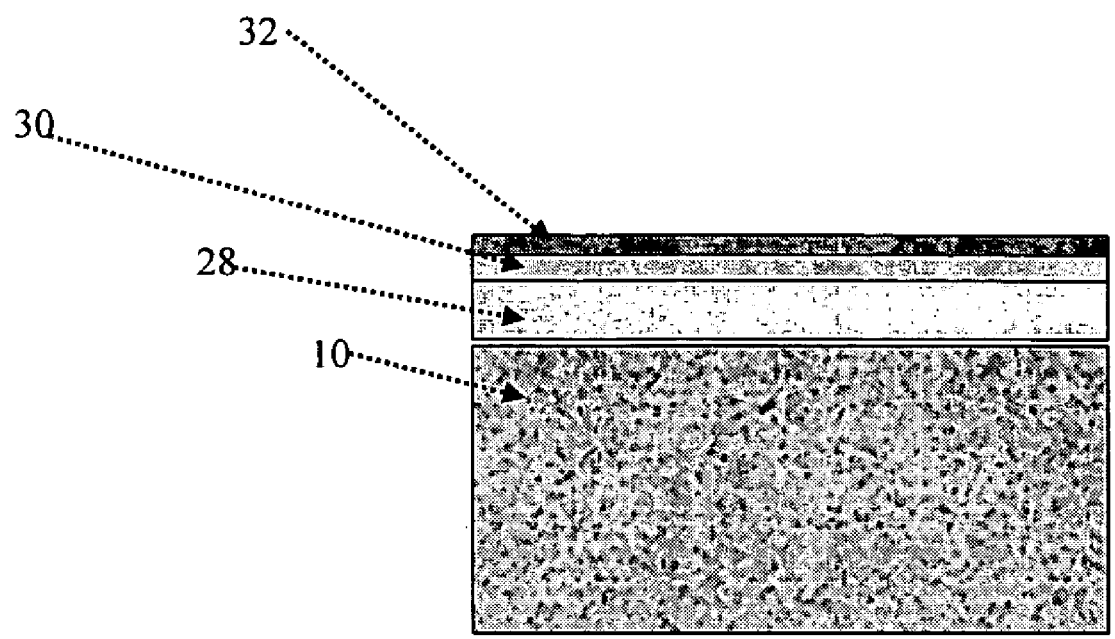
FIG. 2 is a schematic representation of the improved gas separation membrane in accordance with one embodiment of the present invention.

The further improvement of this invention over U.S. patent application Ser. No. 09/822,927 is disclosed in FIG. 2. The underlying fibrous metal media substrate 10, when used for high temperature applications (greater than 1000° F. (540° C.)), is desirably formed from Fecralloy™ or an advanced nickel-based metal alloy such as Haynes® 230, Haynes® 214, and the like, for combustion gas applications such as pressurized fluidized bed combustion or pressurized circulating fluidized bed combustion. Fecralloy™ or an advanced nickel-based metal alloy such as Haynes® 160, and the like are good candidates for reducing gas applications such as are employed in integrated gasification combined cycle plants.

The improvements to the high temperature, hydrogen gas separation membrane disclosed herein include a physically interlocking barrier layer 28 formed on the metal substrate 10 in a manner to create a spinel or intermetallic architecture bonding of the metal barrier layer 28 onto the surface of the fibrous, metal media, structural support substrate 10. Both physical/mechanical interlocking and spinel or intermetallic formation improve adherence between the fibrous metal substrate and barrier coating during use of the metal media membrane in high temperature, gas separation applications.

Additionally, in the preferred embodiment, a tantalum/niobium layer is formed between the outer transport layer 32 and the barrier layer 28 to facilitate enhanced hydrogen flux through the proton transport layer by enabling the formation of a thinner transport layer made out of a precious metal such as palladium, palladium alloys, and the like and serves to initiate catalysis/chemisorption and dissociation of hydrogen in the process gas stream. The use of the tantalum/niobium interface additionally reduces the thickness of the proton transport layer 32, and thus the reduced cost of the gas separation membrane and improves its efficiency.

As a result of the application of the barrier layer 28, the porosity of the matrix is reduced, but still permits passage of air through the structure. Part of the uniqueness of applying a barrier layer 28 onto the surface of the fibrous metal substrate 10, is the capability of the barrier layer to form spinel phases with the underlying fibers, forming a more adherent bond between the adjoining layers. Experimental results have shown that a nickel-aluminum spinel phase/interface region results when an "Alseal-500" series coating, available from Coatings for Industry, Souderton, Pa., is applied to the surface of a dense nickel-based Haynes® 214 catalytic combustion substrate tube. The Haynes® 214 substrate alloy is available from Haynes International, Inc., Kokomo, Ind. It is known from the literature that thin metal wire (tungsten or phoretic stainless steel) can be aluminized via application of metallic aluminum onto the surface of the wire. When heated, the outermost layer of aluminum is converted to alumina, and encourages diffusion of the inner layer of aluminum into the body of the metal wire, forming a thin metal/aluminum alloy layer.

The outer surface of the barrier layer 28 is the surface onto which the precious metal 32, such as palladium, can be deposited. Palladium serves to chemisorb hydrogen molecules, with subsequent dissociation, proton transport through the thickness of the palladium coating and finally, reassociation of hydrogen in the permeate gas stream. The thickness of the applied dense palladium layer 32 should be less than 100 microns and, more preferably due to the cost of the noble metal, less than 15 microns thick. To further reduce the thickness of the palladium layer, a tantalum/niobium (Ta/Nb) structural layer 30 is applied onto the barrier layer 28. The Ta/Nb layer should be understood throughout this application to comprise either Ta or Nb or a combination of both elements. The final palladium layer 32 is used in the disclosed hydrogen gas separation concept of this invention to serve as the catalytic activator, initiating chemisorption and dissociation of gas phase hydrogen. Limited mixing of the Pd and Ta/Nb can be expected to result in a very narrow diffusion zone.

It is known that onsite purification of hydrogen using a non-porous metal membrane can be used to effect the separation of ultra-pure hydrogen. Specifically, the techniques which have been used involve the use of vanadium or tantalum foil coated along both sides with palladium. In operation, molecular hydrogen ($H_2$) dissociates into monatomic hydrogen (H) on palladium and diffuses through it. Diffusion then carries the monatomic hydrogen through the vanadium and the second palladium layer, where it recombines into molecular hydrogen. With a higher solubility of hydrogen in (flux through) the Ta/Nb layer in comparison to Pd and the ease at which Ta/Nb can be deposited as a dense coating in comparison to Pd, an effective and reduced overall cost of the external hydrogen or proton transport coating can be realized.

Figure 3:
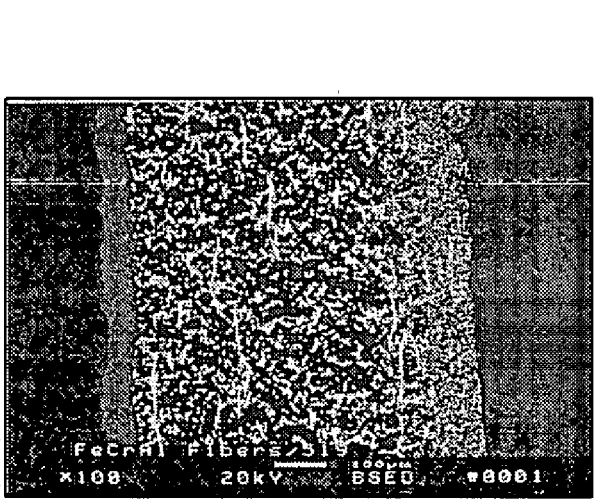
FIG. 3 is a scanning electron micrograph illustrating the structure of the metal/ceramic barrier layer of the gas separation membrane of this invention.

FIG. 3 shows a computer rendition of a scanning electron micrograph which shows the metal barrier coating applied to the outer surface of the sinter-bonded fibrous metal tube before the palladium layer is applied.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention, which is to be given the full breadth of the appended claims and any and all equivalents thereof.

What is claimed is:

1. A method of separating hydrogen gas from a gas stream, said method comprising the steps of:
   flowing the gas stream into contact with a chemisorption-dissociation-diffusion coating supported on a transmission member, the transmission member including a porous body of metal particles compacted and bonded together;
   diffusing disassociated hydrogen through a tantalum/niobium interface layer disposed between the chemisorption-dissociation-diffusion coating and a barrier layer
   diffusing dissociated hydrogen through the barrier layer, interposed between the transmission member and the tantalum/niobium interface layer; and
   exhausting hydrogen gas out of an opposite surface of the transmission member.

2. A gas separation membrane for separating hydrogen from a gas stream, the gas separation membrane comprising:
   a transmission member including a porous body of metal particles of a high temperature nickel based alloy compacted and bonded together the porous body having a first surface and a second surface opposite one another, the metal particles including a quantity of at least one of metal fibers and metal powder;
   a barrier layer being disposed on and bonded to the first surface to form a physical interlocking and spinel or intermetallic architecture;
   a chemisorption-dissociation-diffusion coating being disposed on the barrier layer; and
   the gas separation membrane being structured to receive the gas stream against one of the chemisorption-dissociation-diffusion coating and the second surface and permeate a quantity of hydrogen through the gas separation membrane and out of the other of the chemisorption-dissociation-diffusion coating and the second surface, the chemisorption-dissociation-diffusion coating being structured to permit chemisorption-dissociation-diffusion of hydrogen therethrough.

3. The gas separation membrane of claim 2 wherein the barrier layer comprises metal particles, including aluminum, which are bonded together via a chemical bonding agent or by sintering and heated to form alumina within the barrier layer.

4. The gas separation membrane of claim 3 wherein the barrier layer is catalytically enhanced.

5. The gas separation membrane of claim 2 including a tantalum/niobium interface disposed between the chemisorption-dissociation-diffusion coating and the barrier layer.

6. The gas separation membrane of claim 2 wherein the barrier layer is a nanopowder ceramic-like bonded layer comprising aluminum.

7. The gas separation membrane of claim 2 wherein the barrier layer is <100 µm.

8. The gas separation membrane of claim 7 wherein the barrier layer is between 20–50 µm.

* * * * *